(12) United States Patent
Schelling et al.

(10) Patent No.: US 8,806,855 B2
(45) Date of Patent: Aug. 19, 2014

(54) ARRANGEMENT AND METHOD FOR OPERATING AN EXHAUST GAS AFTERTREATMENT DEVICE

(75) Inventors: Bernd Schelling, Stuttgart (DE); Patrick Bauer, Stuttgart (DE); Mehmet Oencel, Boennigheim (DE); Ralph Bauer, Esslingen (DE); Thomas Holst, Stuttgart (DE); Georg Hoegele, Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 13/391,798

(22) PCT Filed: Aug. 4, 2010

(86) PCT No.: PCT/EP2010/061335
§ 371 (c)(1),
(2), (4) Date: Feb. 22, 2012

(87) PCT Pub. No.: WO2011/032779
PCT Pub. Date: Mar. 24, 2011

(65) Prior Publication Data
US 2012/0159932 A1 Jun. 28, 2012

(30) Foreign Application Priority Data
Sep. 16, 2009 (DE) .......................... 10 2009 029 518

(51) Int. Cl.
*F01N 3/00* (2006.01)
*F01N 3/10* (2006.01)
*F01N 3/02* (2006.01)

(52) U.S. Cl.
USPC .................. 60/277; 60/286; 60/295; 60/303; 60/311

(58) Field of Classification Search
USPC .................... 60/277, 286, 295, 297, 303, 311
See application file for complete search history.

(56) References Cited

U.S. PATENT DOCUMENTS

| | | | |
|---|---|---|---|
| 6,961,653 B2 | 11/2005 | Maki | |
| 7,421,333 B2 | 9/2008 | Sawada et al. | |
| 2007/0251224 A1 | 11/2007 | Andrews et al. | |
| 2007/0277786 A1* | 12/2007 | Barnes et al. | ............... 123/478 |
| 2008/0077303 A1 | 3/2008 | Zushi et al. | |
| 2008/0241299 A1* | 10/2008 | Bazzo et al. | ............... 425/144 |
| 2008/0282677 A1 | 11/2008 | Gonze et al. | |
| 2009/0188239 A1* | 7/2009 | Ploton et al. | ................ 60/286 |
| 2010/0319322 A1 | 12/2010 | Hüthwohl | |

FOREIGN PATENT DOCUMENTS

| | | |
|---|---|---|
| DE | 4108694 | 9/1992 |
| WO | 2009010471 | 1/2009 |

OTHER PUBLICATIONS

PCT/EP2010/061335 International Search Report.

* cited by examiner

Primary Examiner — Audrey K Bradley
(74) Attorney, Agent, or Firm — Michael Best & Friedrich LLP

(57) ABSTRACT

The invention relates to an arrangement (1) for operating an exhaust gas aftertreatment device, in particular of a motor vehicle, having a plurality of active sensors (3-8) and a control device (2) that comprises at least one voltage supply unit (9) to which the sensors (3-8) are operatively connected. According to the invention, the voltage supply unit (9) comprises at least two supply benches (13-15) that can be switched independently from each other. The sensors (3-8) are grouped according to the function thereof and are then associated with one of the supply benches (13-15).

9 Claims, 1 Drawing Sheet

ARRANGEMENT AND METHOD FOR OPERATING AN EXHAUST GAS AFTERTREATMENT DEVICE

BACKGROUND OF THE INVENTION

The invention relates to an arrangement for operating an exhaust gas aftertreatment device, in particular of a motor vehicle, having a plurality of active sensors and a control module, which comprises at least one voltage supply unit, to which the sensors are operatively connected.

An exhaust gas aftertreatment device, which serves to reduce the pollutants present in the exhaust gas, is generally connected to the exhaust side of modern internal combustion engines. Such exhaust gas aftertreatment devices comprise a plurality of exhaust gas aftertreatment units such as, for example, catalytic converters, particle filters or the like. In order to ensure a long-term operating reliability, a number of sensors, which monitor/register the performance of the exhaust gas aftertreatment device or the various exhaust gas aftertreatment units, or their effect on the exhaust gas, are assigned to the exhaust gas aftertreatment device. For this purpose the sensors are operatively connected to a control module to which they deliver their signals. The signals are generally evaluated in the control module, and if necessary, for example, a warning display is activated for the driver of a motor vehicle. So-called "active sensors" are often used as sensors. These differ from the so-called "passive sensors" in that in order to fulfill their function they need electrical power, which is fed from outside. For this purpose the active sensors are connected to a voltage supply unit of the control module. The active sensors, also referred to as passive transducers, make it possible to determine static and virtually static measured variables.

SUMMARY OF THE INVENTION

According to the invention it is proposed that the voltage supply unit comprise at least two supply banks that can be switched independently of one another, and the sensors, grouped according to their function, each be assigned to one of the supply banks. In contrast to the state of the art, the active sensors are therefore connected to different supply banks that can be switched independently of one another, the sensors being divided between the supply bans according to their function. This means that active sensors (hereinafter simply referred to as sensors), which serve the same or a similar sub-function, are each assigned to a common supply bank. This has the advantage that if a malfunction should occur, only the sensors of one group, that is to say the group having the malfunction, are deactivated and the other sensors continue to operate. Thus it is possible for the exhaust gas aftertreatment device to continue operating even when sensors assigned to an exhaust gas aftertreatment unit are deactivated. Depending on the function of the particular group of sensors, the deactivation of the group is of greater or lesser significance for the exhaust gas aftertreatment device as a whole. Even if a particularly important group of sensors is deactivated, however, restricted operation of the exhaust gas aftertreatment device is still possible, thereby ensuring, in particular, that a driver can at least drive his motor vehicle to the next service workshop since, at least for a certain length of time, the restricted operation of the exhaust gas aftertreatment device serves to prevent lasting damage.

The arrangement preferably comprises a diagnostic circuit for detecting a malfunction of the sensors. The diagnostic circuit is preferably integrated into the control module. The diagnostic circuit monitors the functioning of the sensors and is operatively connected to the latter in such a way that it can attribute a detected malfunction to one of the sensors.

The diagnostic circuit is preferably designed in such a way that it deactivates one or more of the supply banks if a fault is detected in one of the sensors assigned to the corresponding supply bank. If the diagnostic circuit therefore diagnoses a malfunction and attributes it to a specific sensor, it deactivates the supply bank having the specific sensor, in order to prevent malfunctions in the exhaust gas aftertreatment device and any associated damage. Since the sensors are connected to the supply bank grouped according to their function, the deactivation of the other sensors connected to the same supply bank does not constitute a particularly intrusive restriction.

A first group of at least one sensor advantageously relates to particle filter regeneration. These sensors are preferably temperature sensors, or also pressure sensors, for example, which register the pressure of the exhaust gas upstream and downstream of a particle filter, in order to determine its charged state.

A second group of at least one sensor further relates to the metering of exhaust gas aftertreatment agent. The second sensors grouped according to their function therefore serve for the metering of exhaust gas aftertreatment agent. Such sensors are pressure sensors, for example, which register the pressure of the exhaust gas aftertreatment agent, or sensors which register the functional capability of an injection valve or its actuator, for example. These sensors may equally well be temperature sensors for registering the temperature of the exhaust gas aftertreatment agent.

A third group of at least one sensor is furthermore assigned to a feed module for the exhaust gas aftertreatment agent. The feed module, which is preferably embodied as a feed pump, serves for feeding and for the build-up of pressure for the preferably liquid exhaust gas aftertreatment agent. Sensors provided in this group, for example, register the speed of the feed module or the temperature and/or the pressure of the exhaust gas aftertreatment agent. The temperature sensor, for example, serves to monitor whether the temperature of the exhaust gas aftertreatment agent exceeds the freezing point of the exhaust gas aftertreatment agent, and therefore whether feeding of the exhaust gas aftertreatment agent is possible. Here, should the temperature sensor fail, for example, the third group or the corresponding supply bank is deactivated by the diagnostic circuit for safety reasons, so that the feed module is not operated and is not damaged due to frozen exhaust gas aftertreatment agent. The first group and the second group, as have been described above, can nevertheless continue to be operated, so that particle filter regeneration, for example, can be performed despite failure of the third group. This virtually ensures an emergency operation of the exhaust gas aftertreatment device, which allows the driver of a motor vehicle to drive to the nearest service workshop without components of the exhaust gas aftertreatment device being damaged in the process.

The distinguishing feature of inventive method for operating an exhaust gas aftertreatment device, particularly with an arrangement as described above, is that the sensors, grouped according to their function, are assigned to at least two supply banks of the voltage supply unit that can be switched independently of one another. Functionally circumscribed or functional groups of sensors are therefore formed, which are connected to different supply banks of the voltage supply unit, so that the groups can be switched off or deactivated independently of one another.

A supply bank is advantageously deactivated if a fault is detected or registered in a sensor assigned to the corresponding supply bank. Whilst the group or supply bank having the malfunction is deactivated, the other groups can continue to be operated and a restricted operation of the exhaust gas aftertreatment device can be ensured. This affords the advantages described above.

The invention will be explained in more detail below with reference to an exemplary embodiment. In the drawing:

DETAILED DESCRIPTION

Figures 1, 2:
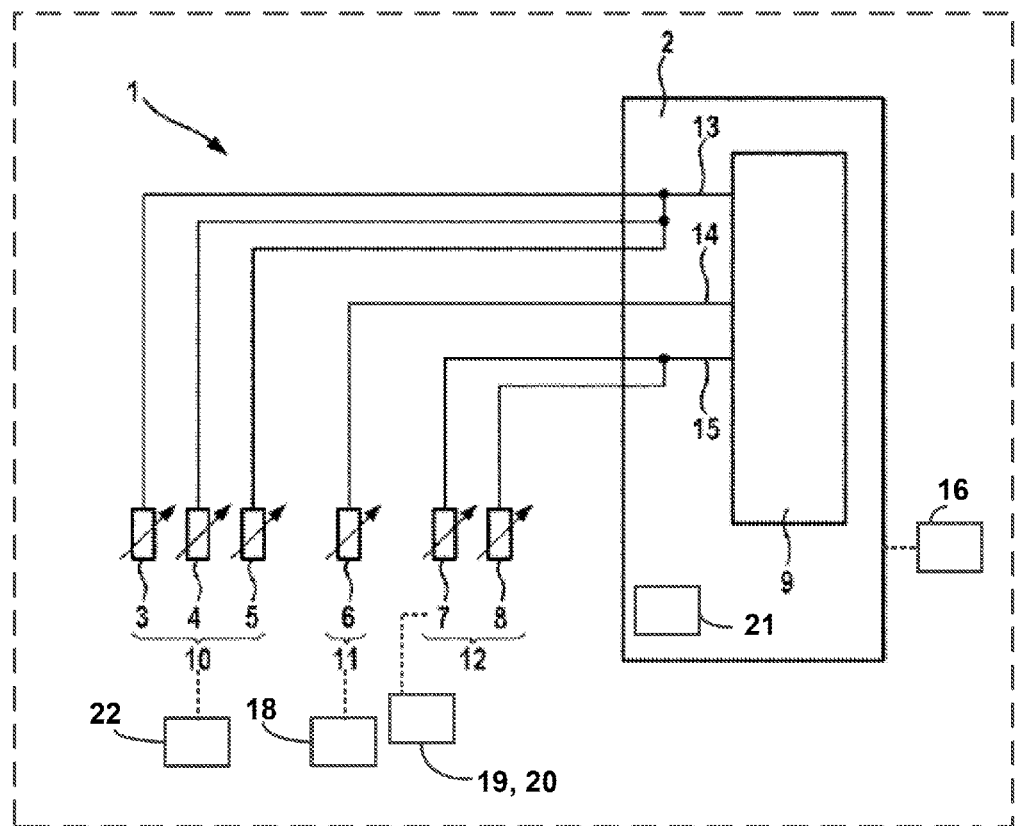
FIG. 1 shows a schematic representation of an advantageous arrangement for operating an exhaust gas aftertreatment device.
FIG. 2 shows an availability matrix representing the operating principle of the advantageous arrangement.

FIG. 1, in a schematic representation, shows an advantageous arrangement 1 for operating an exhaust gas aftertreatment device 16 of an internal combustion engine, in particular of a motor vehicle 17. The arrangement 1 comprises a control module 2 and a plurality of active sensors 3 to 8, which are connected to a voltage supply unit 9 of the control module 2. The sensors 3 to 8 are assigned to different areas and/or elements of the exhaust gas aftertreatment device 16 and serve, among other things, for functional monitoring of various exhaust gas aftertreatment units, such as a particle filter, for example, or an injection valve for exhaust gas aftertreatment agent.

The sensors 3 to 8 are divided into three groups 10, 11 and 12, being grouped according to their function.

The first group 10 comprises the sensors 3 to 5, which relate to the regeneration of a particle filter 22 of the exhaust gas aftertreatment device 16. Thus the sensors 3 and 4, for example, serve for registering a pressure gradient over the particle filter 22, on the basis of which the charged state of the particle filter can be determined. The sensor 5 serves, for example, for registering the temperature of the particle filter 22, which must overwrite a specific threshold for the regeneration of the particle filter 22.

The second group 11 comprises the sensor 6, which is assigned to an injection valve 18 for exhaust gas aftertreatment agent. The injection valve 18 is suitably arranged on an exhaust pipe in such a way that exhaust gas aftertreatment agent fed to the injection valve 18 can be fed to the exhaust gas flowing through the exhaust pipe. The exhaust gas aftertreatment agent is preferably atomized by the injection process, so that it mixes particularly advantageously with the exhaust gas. The sensor 6 here serves, for example, for monitoring the functional capability of the injection valve 18 or of an actuator of the injection valve 18.

The group 12 comprises the remaining sensors 7 and 8, which are assigned to a feed system for the exhaust gas aftertreatment agent. Thus the sensor 7, in particular, is assigned to a feed module 19, preferably a feed pump 20, and registers the functional capability of the feed pump 20, for example, or the pressure of the delivered exhaust gas aftertreatment agent produced by the feed pump 20. The sensor 8 is preferably embodied as a temperature sensor and registers the temperature of the exhaust gas aftertreatment agent to be fed. The sensor 8 therefore serves to ensure that the temperature of the exhaust gas aftertreatment agent lies above its freezing point. Should this not be the case, a heating unit of the exhaust gas aftertreatment device 16 or of the feed system for the exhaust gas aftertreatment agent is preferably activated, in order to thaw out the exhaust gas aftertreatment agent. Until the exhaust gas aftertreatment agent is thawed out, however, an activation of the feed pump 20 would damage it.

The sensors 3 to 8 grouped in this way are assigned to different supply banks 13, 14 and 15 that can be switched independently of one another. The groups 10, 11 and 12 can thereby be deactivated independently of one another. The voltage supply unit 9 preferably distributes the drive current equally to all sensor supply banks. For this purpose a voltage of 3.3V or 5V is preferably applied to all (sensor) supply banks.

FIG. 2 in a matrix shows the main advantage of the arrangement 1 and of the method described above. The groups 10, 11 and 12 are entered in the top line and the effect of a failure of the groups 10, 11 and 12 on the overall system and the other groups 10, 11 and 12 is entered in the lines below.

Should a diagnostic circuit 21 (not represented here) integrated into the control module 2 detect a malfunction in one of the groups 10, 11 or 12, it deactivates the corresponding group 10, 11 or 12 having the malfunction, in order to safeguard it against damage.

Should the diagnostic circuit 21 detect a malfunction of the sensor 3 of the group 10, it thus deactivates the entire group 10. Owing to the advantageous grouping of the sensors 3 to 8, however, this does not have any effect on the groups 11 and 12. If the sensors 3, 4, 5 for the particle filter regeneration have failed, it is still possible to use the relevant sensors for the injection valve 18 or the feed system for the exhaust gas aftertreatment agent, as represented by a check in the corresponding box.

Should the diagnostic circuit 21 detect a malfunction of one of the sensors 7 or 8, however, it deactivates the group 12. As a result, only a limited injection of exhaust gas aftertreatment agent is still possible. This then depends on the remaining or vestigial pressure in the exhaust gas aftertreatment agent feed system, which can no longer be detected, however, owing to the failure of the group 12.

The same correspondingly applies in the event of a failure of the group 11, in which the group 10 still remains fully functional and particle filter regeneration thereby remains feasible, whilst the group 12 is only operationally useable to a limited extent, here represented by a check placed in brackets.

Overall, therefore, the advantageous arrangement 1 and the corresponding method allow continued operation of the exhaust gas aftertreatment device 16, at least to a limited extent, in the event of a failure of one of the groups 10, 11 or 12, so that a minimum pollutant reduction is still ensured and lasting damage is prevented.

What is claimed is:

1. A method for operating an exhaust gas aftertreatment device of a motor vehicle, the device comprising:
    a plurality of active sensors, and
    a voltage supply unit, to which the sensors are operatively connected, the sensors, grouped according to their function and in groups, are assigned to at least two supply banks of the voltage supply unit that are switched independently of one another,
    the method comprising:
    deactivating a supply bank for regeneration of a particle filter if a malfunction is detected in at least one sensor assigned to the corresponding supply bank, while maintaining the other supply bank in an activated state.

2. The method of claim 1, wherein the step of deactivating further includes deactivating a supply bank for an injection valve.

3. A method for operating an exhaust gas aftertreatment device of a motor vehicle, the device comprising:
a plurality of active sensors, and
a voltage supply unit, to which the sensors are operatively connected, the sensors, grouped according to their function and in groups, are assigned to at least two supply banks of the voltage supply unit that are switched independently of one another,
the method comprising:
deactivating a supply bank for a feed module for exhaust gas aftertreatment agent if a malfunction is detected in at least one sensor assigned to the corresponding supply bank, while maintaining the other supply bank in an activated state.

4. The method of claim 3, wherein the step of deactivating further includes deactivating a supply bank for regeneration of a particle filter.

5. The method of claim 3, wherein the step of deactivating further includes deactivating a supply bank for an injection valve.

6. An arrangement (1) for operating an exhaust gas aftertreatment device of a motor vehicle, comprising:
a plurality of active sensors (3-8) grouped according to their function,
a control module (2), which comprises at least one voltage supply unit (9), to which the sensors (3-8) are operatively connected,
at least two supply banks (13-15) that are switched independently of one another operatively connected to the at least one voltage supply unit (9), the sensors (3-8) each being assigned to one of the supply banks (13-15),
a first group (11) of at least one sensor (6) assigned to an injection valve for exhaust gas aftertreatment agent,
a second group (12) of at least one sensor (7, 8) assigned to a feed module for the exhaust gas aftertreatment agent, wherein the at least one sensor (7, 8) of the second group comprises a sensor (7) assigned to a feed pump which registers a pressure of delivered exhaust gas aftertreatment agent produced by the feed pump, and a sensor (8) embodied as a temperature sensor which registers a temperature of the exhaust gas aftertreatment agent to be fed, and
a diagnostic circuit for detecting a malfunction,
wherein the diagnostic circuit deactivates one of the supply banks (13-15) if a fault is detected in one of the sensors (3-8) assigned to the corresponding supply bank (13-15), while maintaining the other supply bank in an activated state.

7. The arrangement as claimed in claim 6, comprising a third group (10) of at least one sensor (3-5) which relates to particle filter regeneration.

8. The arrangement as claimed in claim 7, wherein one of the sensors (5) of the third group registers a temperature of a particle filter (22).

9. The arrangement as claimed in claim 7, wherein two of the sensors (3, 4) of the third group register a pressure gradient over a particle filter (22).

* * * * *